(12) United States Patent
Young

(10) Patent No.: US 6,467,968 B1
(45) Date of Patent: Oct. 22, 2002

(54) BEARING ASSEMBLY IN CIRCULAR CLARIFIERS AND THICKENERS AND METHOD FOR REPLACING SAME

(76) Inventor: Richard Nils Young, 46 Brighton Rd., Atlanta, GA (US) 30309

( * ) Notice: Subject to any disclaimer, the term of this patent is extended or adjusted under 35 U.S.C. 154(b) by 0 days.

(21) Appl. No.: 09/840,757

(22) Filed: Apr. 23, 2001

(51) Int. Cl.[7] ............ F16C 17/04; B23P 19/04; F16H 35/08; F16H 1/06; B01D 21/20
(52) U.S. Cl. ............ 384/420; 29/426.5; 29/402.08; 74/401; 74/413; 210/528
(58) Field of Search ............... 384/226, 248, 384/249, 295, 416, 420; 74/413, 401; 29/426.5, 402.08; 210/528

(56) References Cited

U.S. PATENT DOCUMENTS

| | | | |
|---|---|---|---|
| 978,202 A | * 12/1910 | Prescott | 384/226 |
| 1,975,109 A | 10/1934 | Laughlin et al. | 210/2 |
| 2,126,884 A | 8/1938 | Hardinge | 210/55 |
| 2,265,046 A | 12/1941 | Sabin | 210/55 |
| 2,291,836 A | 8/1942 | Scott | 210/55 |
| 2,322,719 A | 6/1943 | Scott | 74/410 |
| 2,322,720 A | 6/1943 | Scott et al. | 74/306 |
| 2,458,061 A | 1/1949 | Coulter | 261/93 |
| 3,140,996 A | 7/1964 | Scott | 210/528 |
| 3,166,502 A | 1/1965 | Kelly | 210/528 |
| 3,216,570 A | 11/1965 | Cunetta | 210/83 |
| 3,959,151 A | 5/1976 | Liebowitz | 210/528 |
| 4,015,669 A | * 4/1977 | Cole | 74/606 R |
| 4,048,076 A | 9/1977 | Pearre et al. | 210/528 |
| 4,754,672 A | * 7/1988 | VanderPol | 384/248 |
| 5,194,155 A | 3/1993 | Schwartz | 210/519 |
| 5,264,126 A | 11/1993 | Shurtleff | 210/528 |
| 5,481,789 A | 1/1996 | Thomas | 29/426.5 |
| 5,618,107 A | 4/1997 | Bartsch | 366/279 |
| 5,887,982 A | 3/1999 | Wilcher | 384/97 |

* cited by examiner

Primary Examiner—Thomas R. Hannon
(74) Attorney, Agent, or Firm—Needle & Rosenberg, P.C.

(57) ABSTRACT

An apparatus for a clarifier including a central pier terminating in a base plate having a circumferential edge and a ring gear rotatable about the central pier and coupled to a rake structure, the apparatus including a plurality of support bearings and a retaining ring structure. A lower surface of each support bearing seated on and supported by a portion of the base plate and a portion of an upper surface of each support bearing for support of a portion of the bottom of the ring gear, the support bearings placed substantially end-to-end to form a circular bearing extending towards the circumferential edge of the base plate. The retaining ring structure in rotative contact with a portion of the outer circumferential surface of the ring gear, the ring structure including a plurality of removably coupled semi-circular retaining members forming a circular hoop extending normal to the circumferential edge of the base plate, a portion of the circular hoop coupled to the circumferential edge of the base plate, wherein the retaining ring structure aligns the ring gear to rotation about a fixed axis. The apparatus may also include an adjustment mechanism selectively operable with the ring gear to adjust a vertical position of the ring gear relative to a top surface of the base plate.

38 Claims, 8 Drawing Sheets

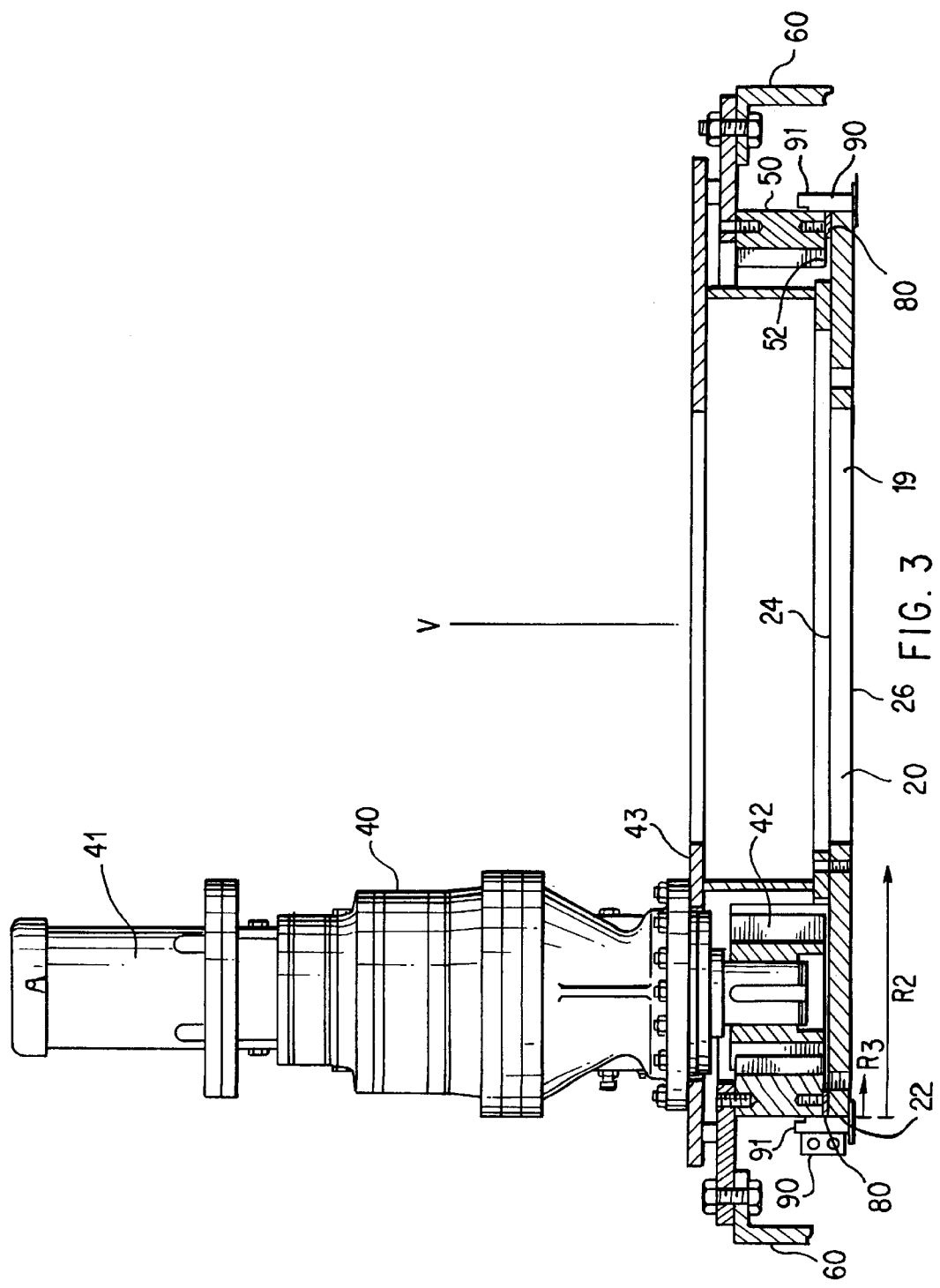

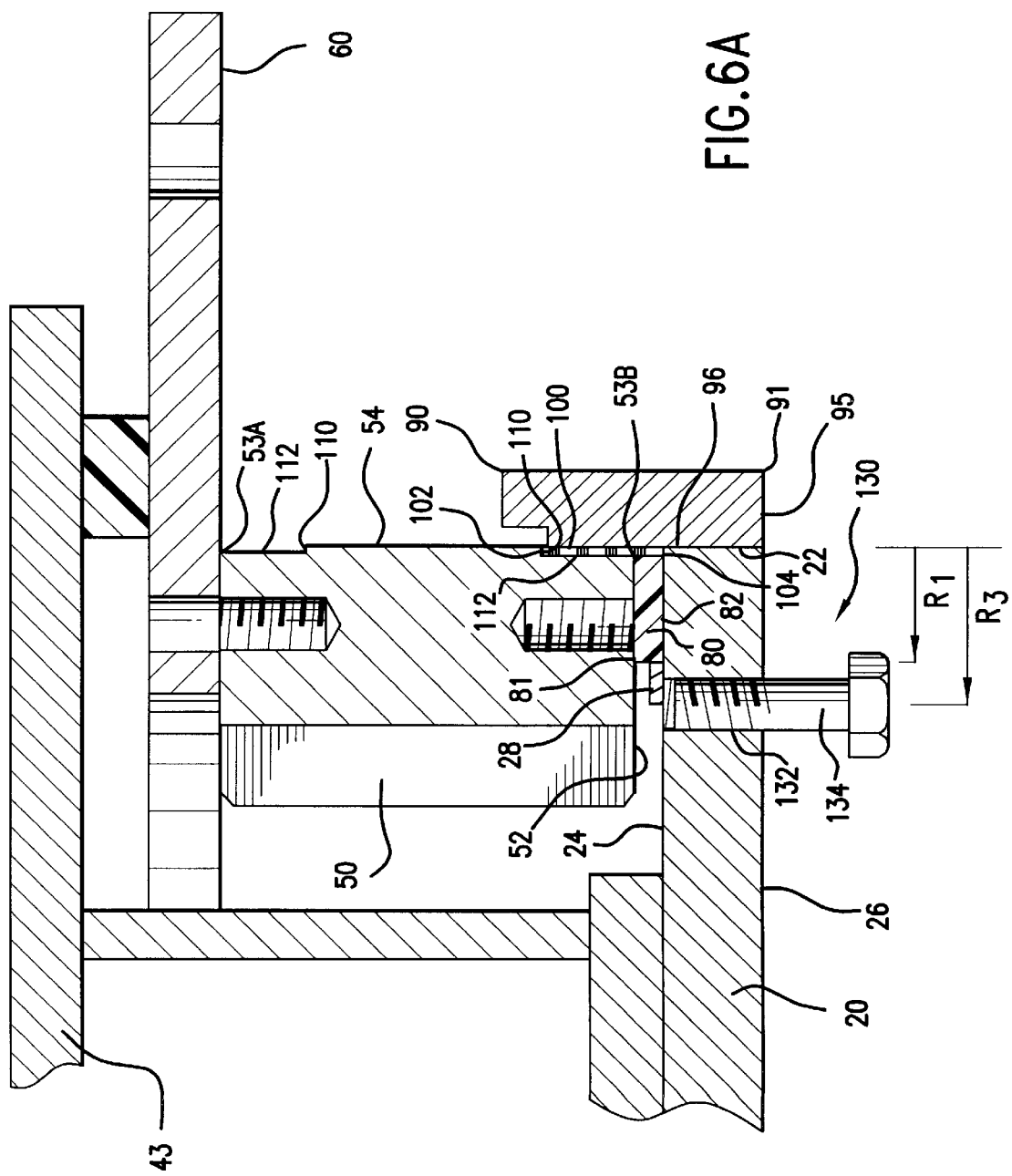

BEARING ASSEMBLY IN CIRCULAR CLARIFIERS AND THICKENERS AND METHOD FOR REPLACING SAME

FIELD OF INVENTION

This invention relates to bearing assemblies and, more particularly, to bearing assemblies in a mechanism that drives rake arms in a clarifier or thickener of a type having a rotating rake structure used in the treatment of water, wastewater, or used in process industries such as minerals processing and pulp and paper.

BACKGROUND OF THE INVENTION

Circular clarifiers and thickeners are typically used to hold a mixture of solids and liquids for separation of the solids from the liquid. The mixture is typically wastewater, and the solids are generally in the form of sludge. The clarifier provides an opportunity for solids that are suspended in the fluid being treated to fall to the bottom of the clarifier where they can be removed as sludge.

The term clarifier is generally employed to identify the structure described herein where there is a continuous flow of liquid, such as water, through the tank. The term thickener is generally employed to describe the same structure but which functions to process heavier or thicker consistency solids at the bottom of a tank. Therefore, the term clarifier is meant to encompass thickeners.

To permit continuous operation of a clarifier, it is necessary to provide for efficient removal of sludge from the bottom of the clarifier. Typically, a rake structure is provided for this purpose. The rake structure is arranged to "plow" the sludge to a receptacle where it is removed from the clarifier by methods known to those skilled in the art. In a typical installation, such a clarifier includes a central pier extending vertically upwardly from the bottom of the clarifier, a drive mechanism supported by the central pier, a large ring gear at the top of the pier and driven by the drive mechanism, and the rake structure. The rake structure is supported by the ring gear so that rotation of the ring gear causes the rake structure to rotate about the bottom of the clarifier. The clarifier further includes a bearing assembly for support of the ring gear. The clarifier may further include a support on the pier and a bridge mounted on the support and providing access from radially outside the clarifier to the top of the pier.

The bearing assembly of choice typically uses integral precision ball bearings mounting in respective outer and inner bearing races. The clarifier thus typically includes stationary parts, which do not rotate with respect to the pier, including a drive housing, the outer bearing race, a cover plate to cover and protect the gear and the bearing assembly and to support the power source, and the power source itself. The clarifier also typically includes rotating parts, including the ring gear with its integral inner bearing race and the rake structure. Of all the components in a clarifier, the bearing assembly typically requires the most maintenance. In the conventional bearing assembly using integral precision ball bearings, the weight of the rake structure is borne by the ball bearings positioned between the inner and outer bearing races and the torque required to drive the rake structure is transmitted via the drive mechanism to the ring gear. Removal and repair of the bearing assembly is not a typical consideration in clarifier design as it is intended that the gear and the bearing assembly will outlive other equipment in the clarifier and, thus, the gear and the bearings will not have to be removed from the clarifier. However, because the environment in clarifiers is normally corrosive, condensation occurs in lubricating oil in the bearings. This and other factors can lead to failure of the gear and/or the bearing assembly, necessitating access to the ring gear, ball bearings and bearing races for maintenance or replacement.

Normally, in order to service or replace the ball bearings and bearing races, it is necessary to disconnect the rake structure from the ring gear. This procedure requires supporting the rake structure prior to disconnecting the rake structure from the ring gear which usually requires draining the clarifier. Thus, a relatively simple and inexpensive job is turned into a laborious and expensive project involving the disconnecting and supporting the rake structure while disassembling, repairing, and reassembling the drive mechanism, then reconnecting the rake structure and removing the supports. Further, before the gear can be removed, the bridge must be removed, normally using a large crane or other lifting device.

SUMMARY OF THE INVENTION

In accordance with the purposes of this invention, as embodied and broadly describe herein, this invention, in one aspect, relates to an apparatus for a clarifier that includes a central pier terminating in a base plate and a ring gear. In another aspect, this invention relates to a method of performing maintenance on a bearing assembly of a substantially horizontal ring gear of a clarifier. The apparatus comprises a plurality of support bearings and a retaining ring structure. Each support bearing is positioned between the base plate and the ring gear such that a lower surface of each support bearing is seated on and supported by a portion of a top surface of the base plate and such that an upper surface of each support bearing supports a portion of the bottom of the ring gear. The support bearings may be placed substantially end-to-end in relation to adjacent support bearings to form a substantially circular bearing extending towards a circumferential edge of the base plate.

The retaining ring structure aligns the ring gear to rotation about a fixed-axis and is in rotative contact with a portion of the outer circumferential surface of the ring gear. The retaining ring structure includes a plurality of semi-circular retaining members. The proximal and distal ends of the retaining members are complementarily formed so that the proximal end of one retaining member is adapted to be removable coupled to the distal end of an adjoining retaining member. When the retaining members are removably coupled to each other, the coupled retaining members form a circular hoop that extends normal to the base plate. When the retaining means are coupled, a portion of the formed circular hoop is in contact with the circumferential edge of the base plate.

The retaining ring structure may also include a plurality of locating bearing members. In this embodiment, each locating bearing member is interposed between a portion of an interior surface of the circular hoop and a portion of the outer circumferential surface of the ring gear.

DETAILED DESCRIPTION OF THE FIGURES OF THE DRAWINGS

The accompanying drawings, which are incorporated in and constitute a part of this specification, illustrate several embodiments of the invention and together with the description, serve to explain the principals of the invention.

FIG. 3 is a partial cross-sectional view of the clarifier drive mechanism of the present invention including a retaining ring structure and a support bearing.

FIG. 6A is a partial exploded cross-sectional detail view illustrating a method of removing a bearing assembly from the circular clarifier of FIG. 1 and showing an adjustment mechanism in a first position in which the support bolts do not protrude above a top surface of the base plate.

DETAILED DESCRIPTION OF THE INVENTION

The present invention is more particularly described in the following examples that are intended to be illustrative only since numerous modifications and variations therein will be apparent to those skilled in the art. As used in the specification and in the claims, the singular form "a," "an" and "the" may include plural referents unless the context clearly dictates otherwise.

Figure 2:
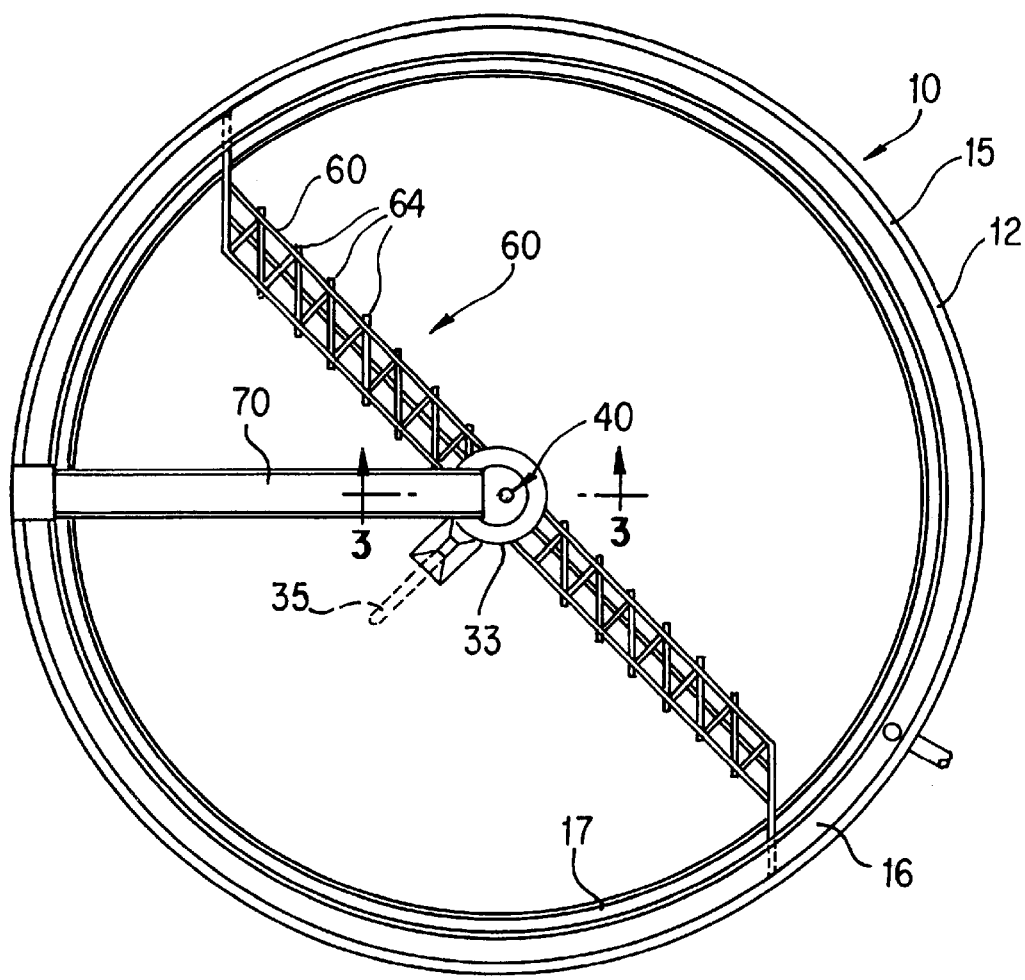
FIG. 2 is a top plan view of the circular clarifier of FIG. 1.
Figure 1:
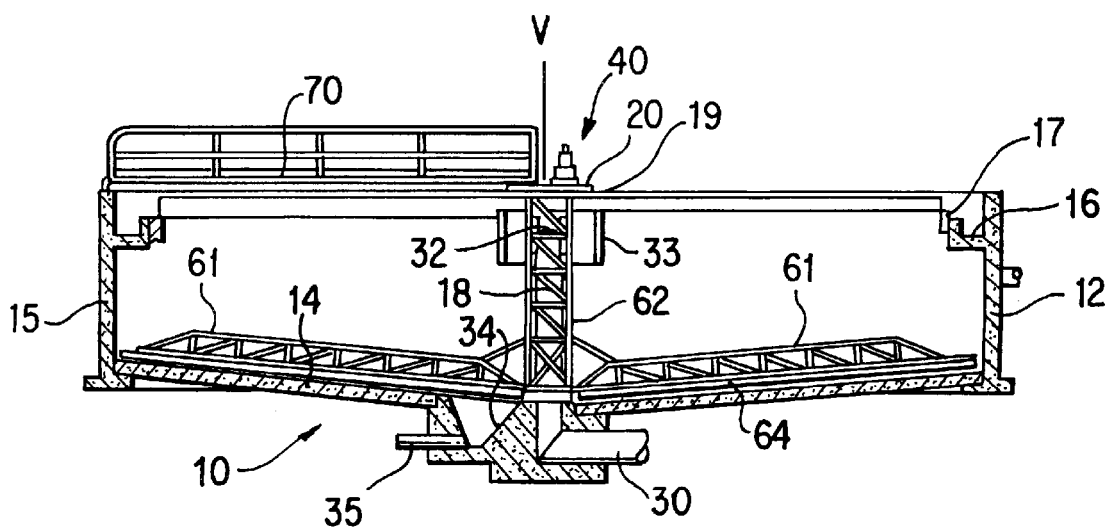
FIG. 1 is a partially broken away front cross-sectional view of a circular clarifier (or thickener) including a central pier, a ring gear housing on the central pier, a rake structure supported by and rotated by the ring gear, and a bridge leading to the central pier.

In accordance with the purposes of this invention, as embodied and broadly described herein, this invention, in one aspect, relates to an apparatus for a clarifier 10. Turning to the drawings, FIGS. 1 and 2 show a typical circular clarifier 10. The clarifier 10 is in large part conventional, and the following discussion will take up first the conventional aspects of the clarifier 10, before turning to the detailed description of the embodiments of the apparatus of the present invention. The clarifier 10 includes a tank 12 having a bottom 14, having a generally cylindrical wall 15, and having an effluent launder 16. The clarifier 10 includes an effluent weir extending along the inner circumference of the effluent launder 16 and extending vertically above the effluent launder 16. The clarifier 10 includes a central pier 18 extending upwardly from the bottom 14 of the tank 12 and having a top 19. In the illustrated embodiment, the top 19 of the pier is defined by a metal base plate 20; however, other materials or pier configurations could be employed. The base plate 20 has a circumferential edge 22, a top surface 24 and an opposed, spaced-apart bottom surface 26. A portion of the bottom surface 26 of the base plate 20 is connected to the central pier 18.

Such a conventional clarifier 10 generally also includes an influent pipe 30, through which influent to be treated is introduced into the tank 12. The influent pipe 30 extends from below the tank 12 through the central pier 18 and has an outlet 32 proximate to the top 19 of the central pier 18. The clarifier 10 may optionally include a generally cylindrical influent baffle 33 surrounding the pier and extending upwardly from a location below the outlet 32. The tank 12 further includes a sludge pump 34 extending downwardly from the bottom 14 of the tank 12, adjacent the central pier 18. The clarifier 10 includes a sludge draw-off pipe 35 in communication with the sump, which is used to draw the settled solids or sludge out of the tank 12. The bottom 14 of the tank 12 may be sloped toward the central pier 18.

Additionally, the clarifier 10 includes, on the top 19 of the pier, a drive mechanism 40 and a ring gear 50 driven by the drive mechanism 40. As one skilled in the art will appreciate, the drive mechanism 40 may include a power source 41 such as a drive unit or motor, a reducer (not shown) driven by the drive unit and having a shaft, and a pinion 42 driven by the shaft of the reducer. The drive mechanism 40 may also include a drive mount 43 which is connected to the top surface 24 of the base plate 20 by, for example, bolts and to which the power source 41 is connected. The drive mount 43 is connected to the top surface 24 of the base plate 20 generally at a second radial $R_2$ distance from the circumferential edge 22 of the base plate 20. In use, the pinion 42 is in operative contact with the ring gear 50. The ring gear 50 may be an annular unsplit (unitary) ring gear 50. In the illustrated embodiment, a spur gear is used for the ring gear 50. However, one skilled in the art will appreciate that a helical, herring bone, or other type gear may also be suitable for use in this invention. The ring gear 50 is supported so that it rotates about a central vertical axis V with respect to the pier.

The clarifier 10 further includes a rake structure 60 including a vertically extending drive cage 62 surrounding the pier and rake arms 61 extending generally radially from the bottom 14 of the drive cage 62. The rake structure 60 further includes scraper blade 64 or squeegees depending downwardly from the rake arms 61 for sweeping the bottom 14 of the clarifier 10 as the rake structure 60 is rotated about the central pier 18. The rake structure 60 is fixed to and supported by the ring gear 50 so that, upon rotation of the ring gear 50 about the central vertical axis, the rake structure 60 correspondingly rotates about the central vertical axis of the central pier 18. In one example, the rake structure 60 may be a rigid, girder type construction that is mounted in the tank 12 for rotation about the pier 18. In an alternative embodiment (not shown), the rake arms 61 of the clarifier 10 may be replaced with a suction sludge removal apparatus, which typically includes a long tube with holes along its length through which sludge is sucked for removal via the pipe.

An access bridge 70 has one end radially outward of the wall 15 and has another end supported by the central pier 18. The bridge 70 is located above the tank 12 and allows maintenance personnel access to the central pier 18.

In use, influent, such as waste fluids, enters the clarifier 10 through the influent pipe 30 which supplies influent into a vertical pipe (not shown) at the base of the central pier 18, and this pipe conducts influent to the outlet 32 proximate the top 19 of the column. Solids in the influent gradually settle to the bottom 14 on the tank 12 where they are collected by the rake arms 61 of the rake structure 60 as they sweep the bottom 14 of the clarifier 10. The sludge is eventually directed toward the draw-off pipe 35 where it is drawn out of the clarifier 10.

Referring to FIGS. 3 and 4A–C, the clarifier 10 also includes an apparatus for rotational support of the ring gear 50. The apparatus comprises a plurality of support bearings 80 and a retaining ring structure 90. Each support bearing 80 has an upper surface 81, an opposite lower surface 82 and a pair of spaced-apart ends 84. The upper surface 81 of the support bearing 80 is spaced apart from the lower surface 82. Preferably, the upper 81 and lower surfaces 82 of the support bearing 80 are generally planar and are oriented so that the upper 81 and lower surfaces 82 are generally in parallel planes. The lower surface 82 of each support bearing 80 is seated on and supported by a portion of the top surface 24 of the base plate 20. In similar fashion, in operational use, a portion of a bottom 52 of the ring gear 50 is supported by the upper surface 81 of each support bearing 80.

The material used to form the support bearing 80 is selected from the consisting of a polymer, nylon, UHMW polyethylene, and the like. However, the support bearings 80 may be made of any suitable material capable of rotatively supporting the ring gear 50 and the attached rake structure 60.

The retaining ring structure 90 is in rotative contact with an outer circumferential surface 54 of the ring gear 50 and aligns the ring gear 50 to rotation about a fixed axis, here, for example, the central vertical axis V of the central pier 18. The retaining ring structure 90 includes a plurality of semi-circular retaining members 91. Each of the retaining members 91 has a proximal end 93 and a distal end 94. The proximal 93 and distal ends 94 of the retaining members 91 are complementarily shaped so that the proximal end 93 of one retaining member is adapted to be removably coupled to the distal end 94 of an adjoining retaining member 91. When the retaining members 91 are coupled together about an outer circumferential edge 22 of the base plate 20, the coupled retaining members 91 form a circular hoop 95. The formed circular hoop 95 has an interior surface 96. As one will appreciate, a portion of the interior surface 96 of the formed circular hoop 95 is coupled to the circumferential edge 22 of the base plate 20 and the coupled circular hoop 95 extends substantially normal to the surface of the base plate 20 to form a ring gear retaining lip structure. The formed circular hoop 95 is sized to complementarily accept the ring gear 50.

Each retaining member 91 has an arcuate interior surface 92. In one embodiment shown in FIG. 4A, a portion of the arcuate interior surface 92 of each retaining member 91 is in rotative contact with a portion of the outer circumferential surface 54 of the ring gear 50 when the retaining members 91 are coupled to each other about the base plate 20. In this example, preferably at least the portion of the arcuate interior surface 96 of the retaining member that is in rotative contact with the outer surface 54 of the ring gear 50 is formed from a bearing material 97. The bearing material 97 may be, for example, a polymer, a metal-impregnated polymer, bronze, a bronze alloy, and the like. As one will appreciate, the entire retaining member 91 may be formed from the bearing material 97. However, to maintain the structural integrity of the retaining ring structure 90, preferably the retaining members 91 are formed from a rigid metal, such as steel; however, the retaining members 91 could be made of any suitable material capable of aligning the ring gear 50 to rotation about the fixed axis. If the retaining member 91 is formed from rigid metal, a boundary layer 98 of the bearing material 97 may be affixed to the retaining member 91 to form at least a portion of the arcuate interior surface 92 of the retaining member 91.

Figure 4A:
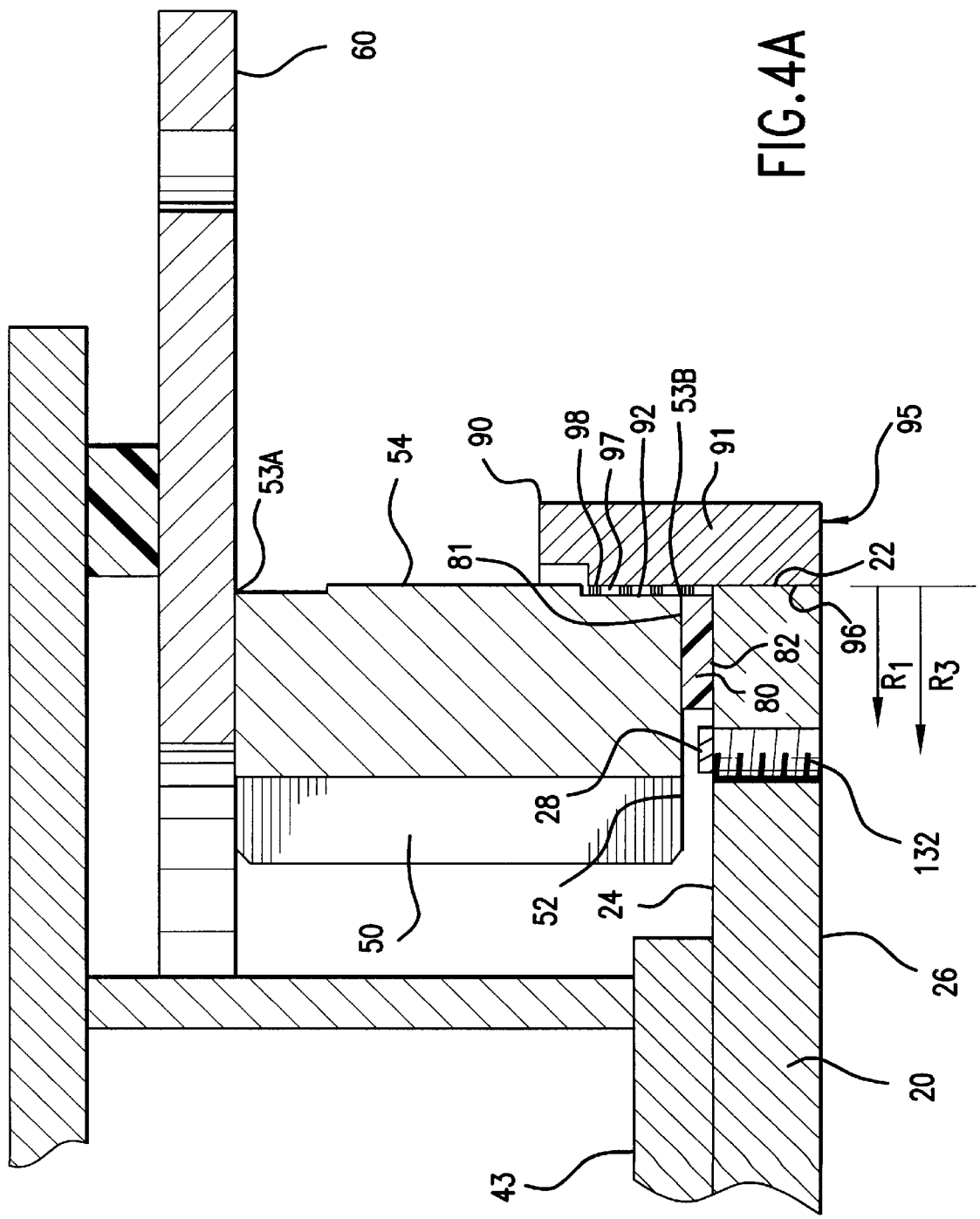
FIG. 4A is a partial cross-sectional detail view of one embodiment of the apparatus showing a retaining ring structure and a support bearing.
Figure 4B:
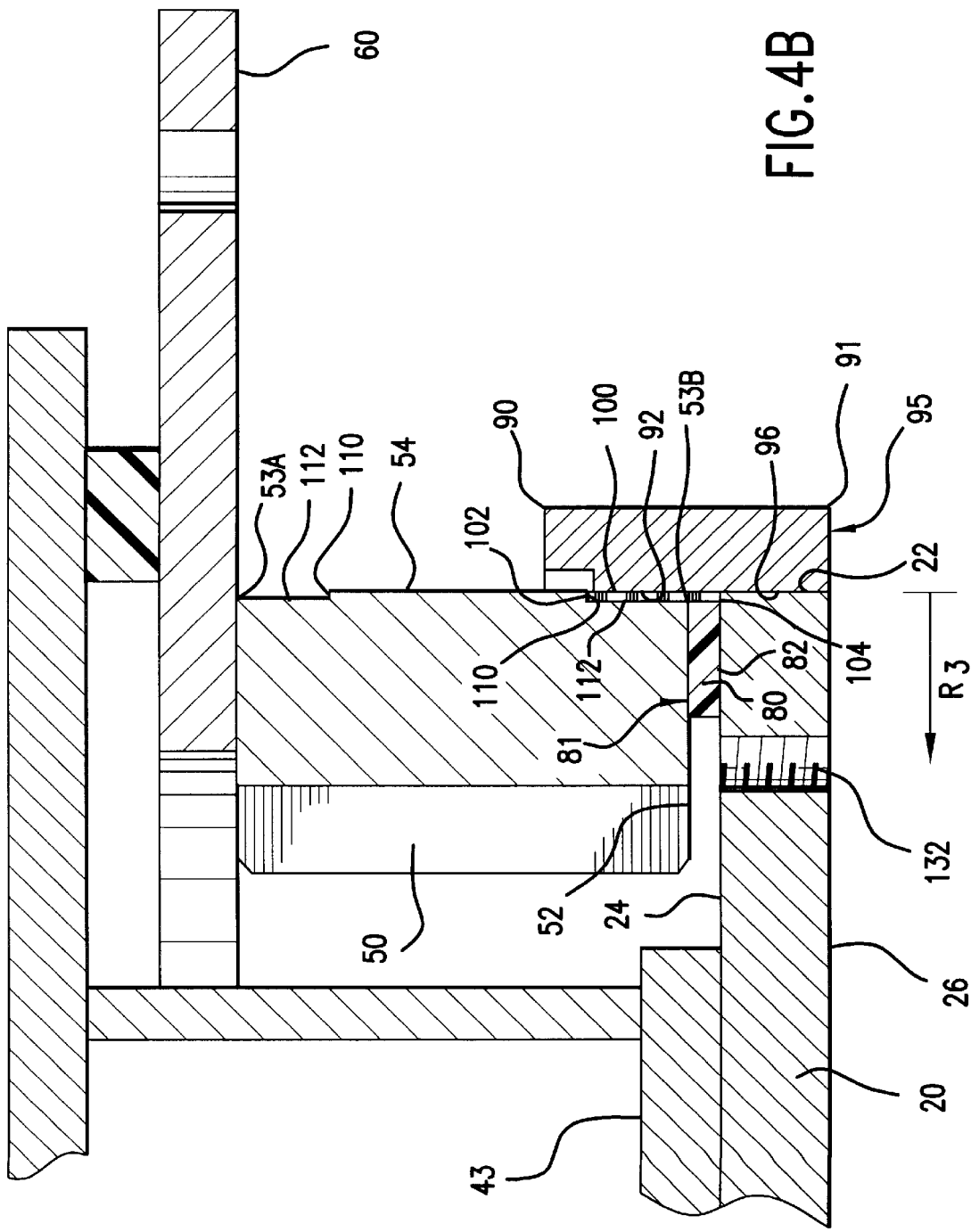
FIG. 4B is a partial cross-sectional detail view of second embodiment of the apparatus showing a retaining ring structure and a support bearing.
Figure 4C:
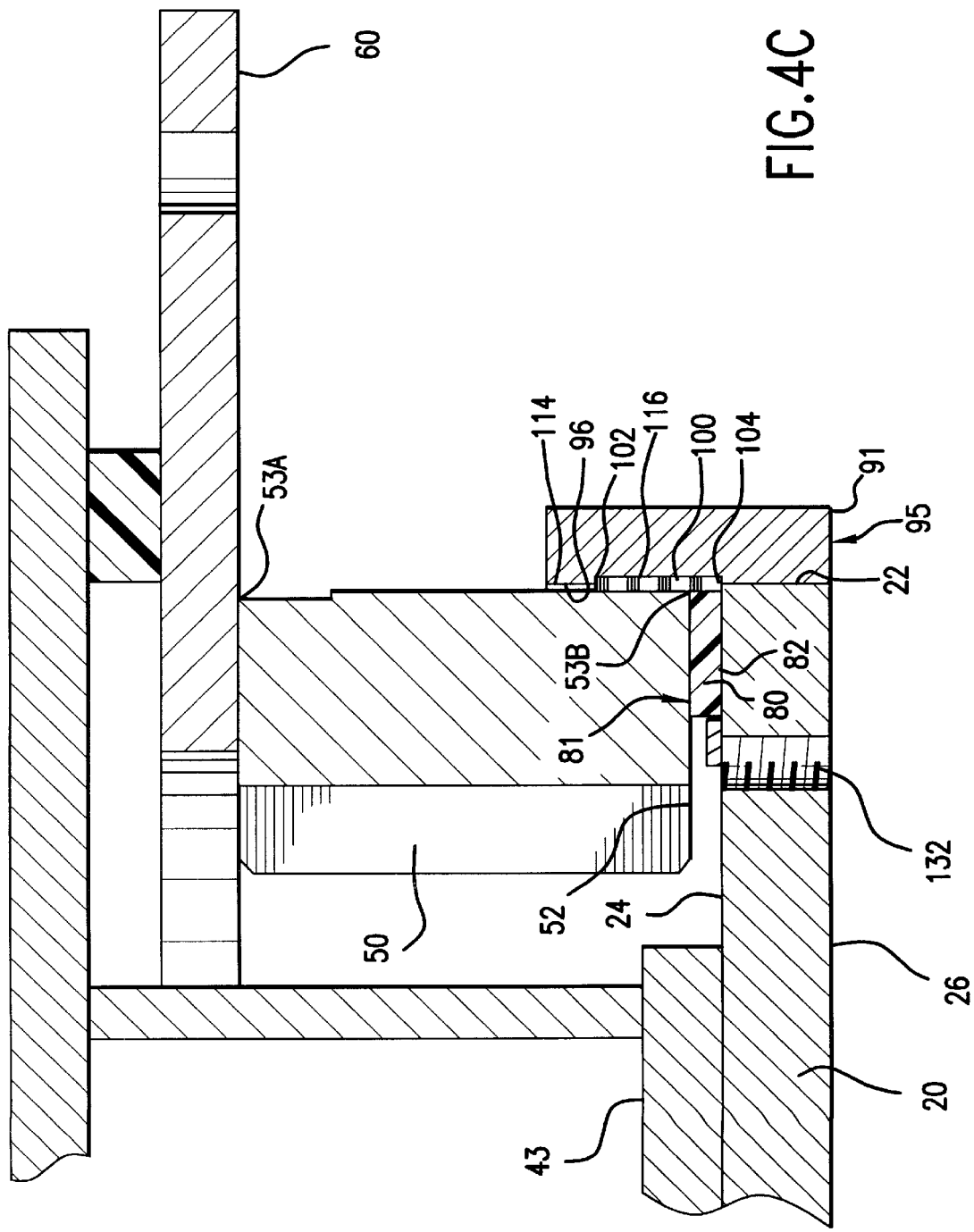
FIG. 4C is a partial cross-sectional detail view of third embodiment of the apparatus showing a retaining ring structure and a support bearing.

In alternative embodiments shown in FIGS. 4B and 4C, the ring structure further includes a plurality of locating bearing members 100. Each locating bearing member 100 is interposed between a portion of the interior surface 96 of the formed circular hoop 95 and the portion of the outer surface 54 of the ring gear 50. Thus, the locating bearing members 100 are on the inside diameter of the formed circular hoop 95 and extend inwardly from the circumferential edge 22 of the base plate 20. In use, each locating bearing member 100 is interposed between a portion of the interior surface 96 of the formed circular hoop 95 and a portion of one or more support bearings 80 so that, as shown in the figures, the support bearings 80 are positioned inward of the locating bearing members 100. Further, as one will appreciate, the support bearing 80 are not required for support and/or positioning of the locating bearing members 100. In the exemplified embodiments, the formed circular hoop 95 and the interposed locating bearing members 100 align the ring gear 50 to rotation about the fixed vertical axis V. The locating bearing members 100 may be flexible or may have a shape that is complementary to the interior surface 96 of the formed circular hoop 95 and the contact portion of the outer circumferential surface 54 of the ring gear 50.

The material used to form the locating bearing members 100 include, for example, polymers, metal-impregnated polymers, bronze, bronze alloys, and the like. However, the locating bearing members 100 may be made of any suitable material capable of rotatively supporting the ring gear 50 and the attached rake structure 60.

Turning to the embodiment shown in FIG. 4B, to restrain the locating bearing member 100 against edgewise movement along the outer surface of the ring gear 50, a portion of the outer circumferential surface 54 of the ring gear 50 forms a circumferentially extending stop flange 110 mediate the circumferential edges 53 of the ring gear 50 to define a circumferential female indentation 112 extending from the circumferential edge 53 of the ring gear 50. The locating bearing member 100 is complementarily sized so that a portion of the locating bearing member 100 can fit within a portion of the outer circumferential surface 54 of the ring gear 50 that extends between the circumferential edge 53 of the ring gear 50 that is proximate the top surface 24 of the base plate 20 and the stop flange 110, i.e., within a portion of the circumferential female indentation 112.

Preferably, the locating bearing member 100 is sized so that the length of the locating bearing member 100 extending between a top edge 102 of the locating bearing member 100 and a bottom edge 104 of the locating bearing member 100 is less than the operative distance between the top surface 24 of the base plate 20 and the stop flange 110 of the ring gear 50 (as one will appreciate, this operative distance includes the support bearing 80 interposed therebetween the top surface 24 of the base plate 20 and the bottom 52 of the ring gear 50). Thus, in use, typically a portion of the top edge 102 of the locating bearing member 100 may bear on the stop flange 110 of the ring gear 50 or a portion of the bottom edge 104 of the locating bearing member 100 may bear on the top surface 24 of the base plate 20. Preferably however, a portion of the bottom edge 104 of the locating bearing member 100 bears on the top surface 24 of the base plate 20 during operation while the stop flange 110 restrains the locating bearing member 100 should it attempt to migrate upward edgewise. The top edge 102 and the bottom edge 104 of the locating bearing member 100 typically do not simultaneously bear on the respective stop flange 110 of the ring gear 50 and the top surface 24 of the base plate 20. The preferred sizing of the locating bearing member 100 permits wear of the support bearing 80 interposed between the top surface 24 of the base plate 20 and the bottom 52 of the ring gear 50 without permitting the top edge 102 of the locating bearing member 100 to bear on the stop flange 110 of the ring gear 50 while simultaneously permitting the bottom edge 104 of the locating bearing member 100 to bear on the top surface 24 of the base plate 20.

Further, the locating bearing member 100 has a sufficient cross-sectional width so that the outer circumferential surface 54 of the ring gear 50 is spaced-apart from the interior surface 96 of the circular hoop 95. As one will appreciate, the ring gear 50 may have two circumferential stop flanges 110 proximate each of the respective circumferential edges 53 to define two identical circumferential female indentations 112 at the two respective circumferential edges 53 of the ring gear 50. In this fashion, the ring gear 50 can be "flipped" and used in a mirror inverted position to extend the useful life of the ring gear 50.

Referring now to FIG. 4C, in an alternative embodiment to restrain the locating bearing member 100 against edgewise movement, a portion of the interior surface 92 proximate an upper edge of each retaining member 91 has an outwardly extending lip 114. Thus, when the retaining members 91 are coupled to the circumferential edge 22 of the base plate 20, a female indentation 116 is defined in the interior surface 96 of the formed circular hoop 95. This female indentation 116 extends from the top surface 24 of the base plate 20 proximate the circumferential edge 22 of the base plate 20 to the outwardly extending lip 114 of each of the coupled retaining members 91. The locating bearing member 100 is sized to complementarily fit within the defined female indentation 116. Thus, in use a portion of the top edge 102 of the locating bearing member 100 bears on a portion of the outwardly extending lip 114 of one or more retaining members 91 and a portion of the bottom edge 104 of the locating bearing member 100 bears on the top surface 24 of the base plate 20. Further, the locating bearing member 100 has a sufficient cross-sectional width so that the outer circumferential surface 54 of the ring gear 50 is spaced-apart from the interior surface 96 of the formed circular hoop 95.

Figure 5:
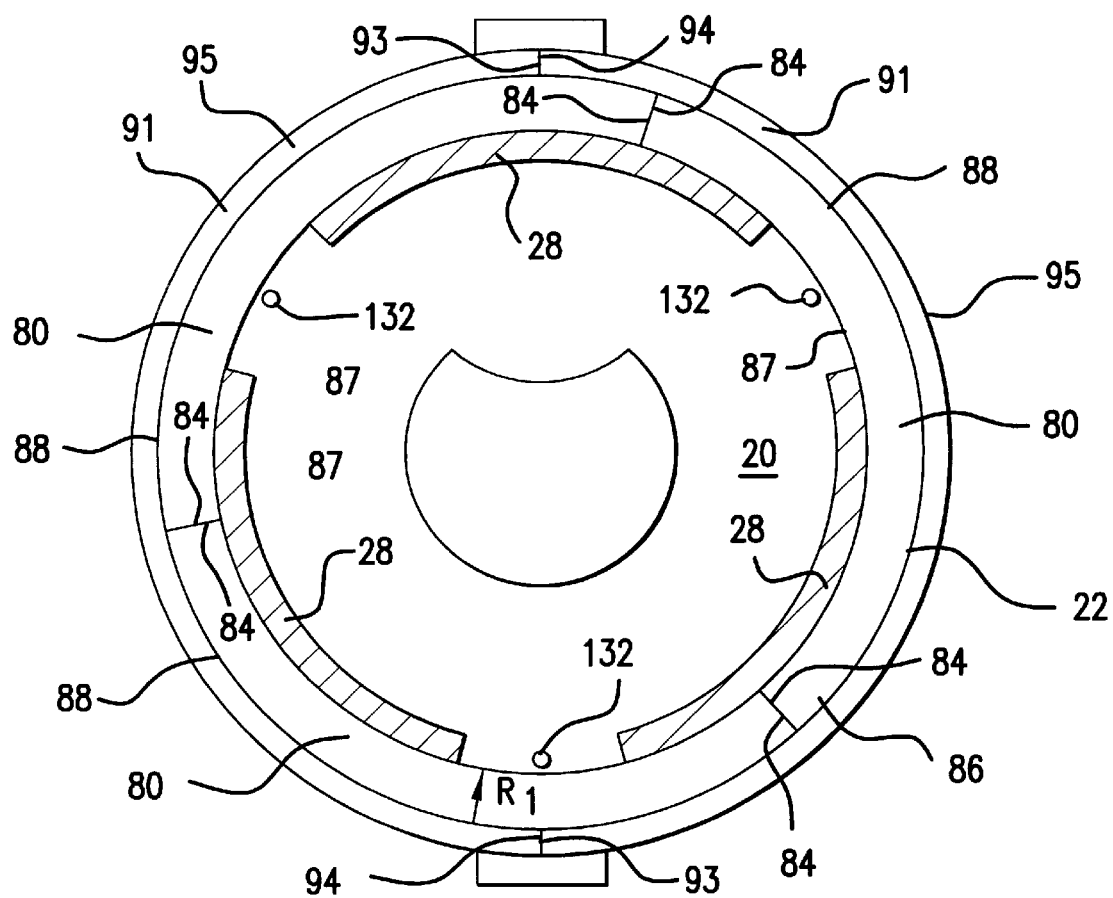
FIG. 5 is a plan view of a base plate having a stop flange and a plurality of bolt holes and showing a plurality of support bearings seated on the base plate and a plurality of retaining members connected to a circumferential edge of the base plate.
Figure 6B:
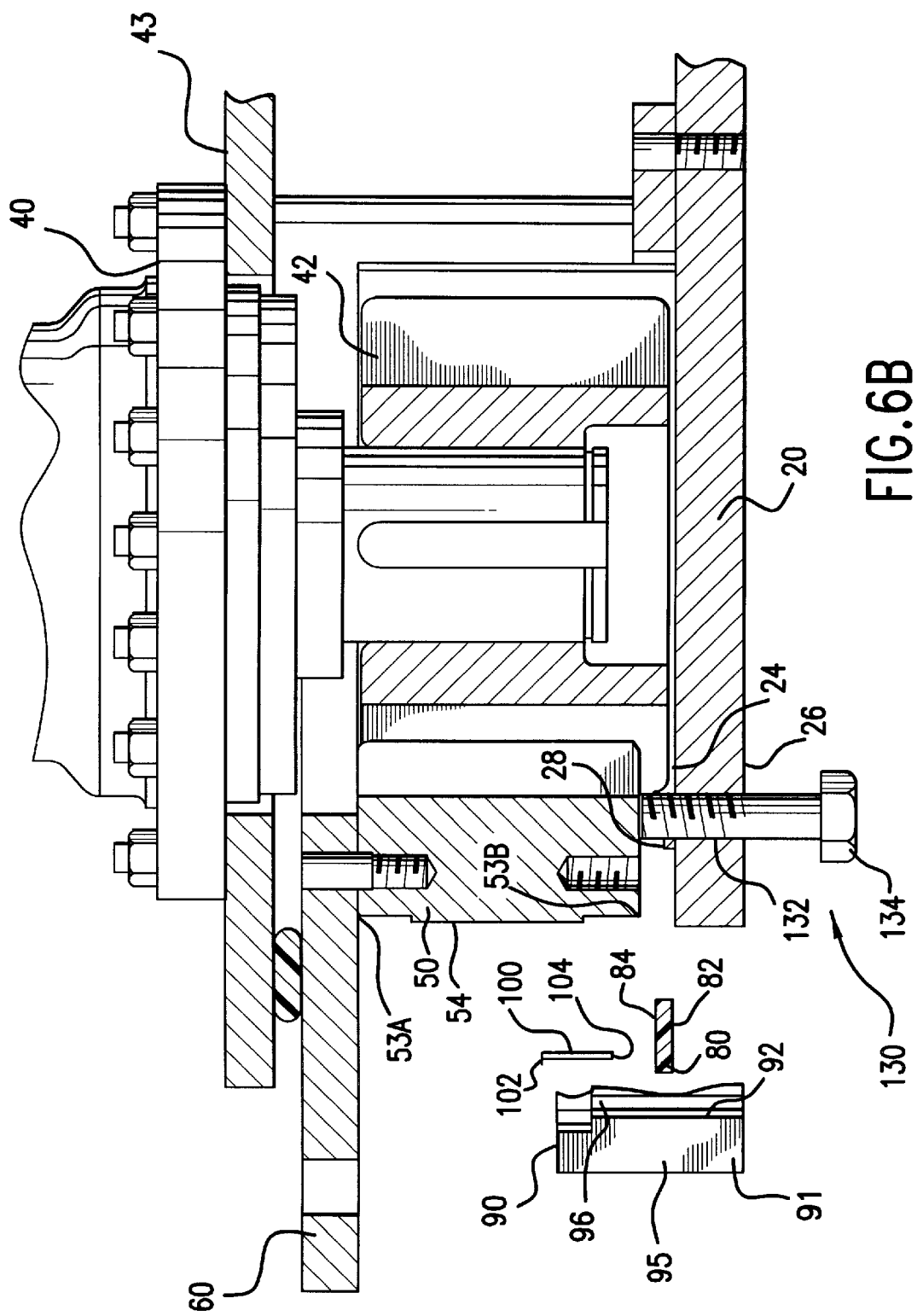
FIG. 6B is a partial exploded cross-sectional detail view illustrating a method of removing a bearing assembly from the circular clarifier of FIG. 1 and showing the adjustment mechanism of FIG. 6A in a second position in which a portion of the support bolts protrude above the top surface of the base plate to contact a portion of the bottom of a ring gear.

Referring now to FIG. 5, the support bearings 80 may be placed substantially end-to-end 84 to form a circular bearing 86 that extends towards the circumferential edge 22 of the base plate 20. The formed circular bearing 86 may be generally continuous or it may be discontinuous. Further the support bearings 80 may have a semi-circular shape in plan view. The support bearings 80 each may have the same general shape and dimensions. Alternatively, the support bearings 80 may have differing shapes and/or dimensions. The only dimension of the support bearing 80 that is preferably substantially constant is the cross-sectional width extending between the upper 81 and lower surfaces 82 of the support bearing 80 so that, in use, the ring gear 50 may be uniformly supported by the plurality of support bearings 80. In an example of a discontinuous circular bearing 86, a plurality of support bearings 80 may be placed onto the top surface 24 of the base plate 20 and spaced apart from each other a predetermined distance or at a random distance.

Further, the top surface 24 of the base plate 20 may include at least one base plate flange 28. Each base plate flange 28 extends upwardly from the top surface 24 of the base plate 20 to a predetermined height. The predetermined vertical height of the base plate flange 28 is less than the cross-sectional height of the support bearings 80. Examples of base plate flanges 28 include posts, arcuate ridges, and the like. The base plate flange 28 is preferably spaced generally at a predetermined radial distance, i.e., a first radial distance $R_1$, from the circumferential edge 22 of the base plate 20. Each of the support bearings 80 has an inner shoulder surface 87 and an opposite outer shoulder surface 88 that extend between the upper 81 and lower surfaces 82 of the support bearing 80. As exemplified in the figures, a portion of the inner shoulder surface 87 of each support bearing 80 may be seated against one or more of the base plate flanges 28. By seating each support bearing 80 against the base plate flange 28, the support bearing 80 is constrained from radial movement away from the circumferential edge 22 of the base plate 20. As shown in FIG. 5, by orienting the support bearings 80 in substantially end-to-end 84 contact with each other, the resulting structure formed by the abutting support bearings 80 further aids in constraining radial movement of the support bearings 80 away from the circumferential edge 22 of the base plate 20.

Referring to FIGS. 3–6B, the clarifier 10 may also include an adjustment mechanism 130 so that the bearing assembly, i.e., the support bearings 80 and the retaining ring structure 90 or portions thereof may be replaced without disconnecting the drive mechanism 40 from the central pier 18 and without disconnecting the rake structure 60 from the ring gear 50. The adjustment mechanism 130 is selectively operable with the ring gear 50 to adjust the vertical position of the ring gear 50 relative to the top surface 24 of the base plate 20. The adjustment mechanism 130 includes a plurality of circumferentially spaced-apart threaded bolt holes 132 extending through the base plate 20 and a plurality of support bolts 134 sized to threadibly engage the threaded bolt holes 132 in the base plate 20. Preferably the bolt holes 132 are spaced generally at a third radial length $R_3$ from the circumferential edge 22 of the base plate 20. The third radial length $R_3$ is greater than or equal to the first radial length $R_1$ (the general distance that the base plate flange 28 is spaced from the circumferential edge 22 of the base plate 20) and is less than the second radial length $R_2$ (the general distance that drive mount 43 is connected to the base plate 20 spaced from the circumferential edge 22 of the base plate 20). As one will appreciate, the bolts holes 132 do not have to be circumferentially spaced apart. They may be in any position interior to the first radial length, so that the support bolts 134 are not forced into contact with an intervening support bearing 80 and so long as the support bolts 134 are accessible from the bottom 26 of the base plate 20 and are extendable to make contact with the bottom 52 of the ring gear 50. Preferably, the bolt holes 132 are equidistantly spaced-apart so that the load of supporting the ring gear 50 and the attached rake structure 60 may be equally distributed.

The plurality of support bolts 134 are moveable from a first position (shown in FIG. 6A), in which the support bolts 134 withdrawn sufficiently so at not to be in contact with the bottom 52 of the ring gear 50, to a second position (shown in FIG. 6B), in which a portion of the support bolts 134 protrude above the top surface 24 of the base plate 20 to contact a portion of the bottom 52 of the ring gear 50. When the support bolts 134 are moved into the second position, the ring gear 50 is vertically raised relative to the top surface 24 of the base plate 20 and is supported by the support bolts 134. In the second position, the ring gear 50 is not being supported by the support bearings 80 and one will appreciate that the support bearings 80 may be readily removed and replaced upon removal of the retaining ring structure 90.

In order to more fully describe the present invention, a preferred method of performing maintenance on an embodiment of the bearing assembly is described. The adjustment mechanism 130 is actuated so that the ring gear 50 is vertically raised relative to the top surface 24 of the base plate 20. Then, the retaining members 91 for accessing the support bearings 80 and the locating bearing members 100, if used, are uncoupled from each other. As one will appreciate, there is no particular order in which the operator must actuate the adjustment mechanism 130 or uncouple the retaining members 91.

To actuate the adjustment mechanism 130 to raise the ring gear 50, the support bolts 134 are moved from the first position, in which the support bolts 134 are not in operative contact or engagement with the bottom 52 of the ring gear 50, to the second position, in which a portion of the support bolts 134 protrude above the top surface 24 of the base plate 20. In the example shown in FIG. 6B, the support bolts 134 are rotated in a clockwise direction to engage or contact the bottom 52 of the ring gear 50, and are farther rotated in the clockwise direction to raise the ring gear 50 enough to take the weight of the ring gear 50 off of the support bearings 80.

The support bearings 80 and the locating bearing members 100, if used, may then be removed. In the disassembled state, the portions of the retaining ring structure 90 and the support bearings 80 may be inspected and replaced as the wear on the individual components dictates. When satisfied with the condition of the support bearings 80, or upon substitution with new support bearings 80, the support bearings 80 are placed onto the top surface 24 of the base plate 20. If the base plate 20 has at least one base plate flange 28, the support bearing 80 may be abutted against the base plate flange 28 to seat the support bearing 80 relative to the circumferential edge 53 of the base plate 20. If the retaining ring structure 90 includes locating bearing members 100, the operator may place the locating bearing members 100 against a portion of the outer circumferential surface 54 of the ring gear 50. The bottom edge 104 of the locating bearing members 100 rest on a portion of the top surface 24 of the base plate 20.

The retaining members 91 are coupled about the circumferential edge 53 of the base plate 20 to enclose the support bearings 80 and the locating bearings. As one will appreciate, the circular hoop 95 resulting from the coupling of the retaining members 91 is closely toleranced so that the retaining ring structure 90 constrains the movement of the ring gear 50 about a fixed axis. After coupling the retaining members 91, the operator actuates the adjustment mechanism 130 to lower the ring gear 50 relative to the top surface 24 of the base plate 20. To lower the ring gear 50, the support bolts 134 are moved from the second position to the first position. In the example shown in FIG. 6A, the support bolts 134 are rotated in a counter-clockwise direction lower the ring gear 50 onto the support bearings 80 so that a portion of the bottom 52 of the ring gear 50 is operably disposed on and supported by at least a portion of the upper surface 81 of the support bearings 80, and are further rotated in the counter-clockwise direction to disengage the support bolts 134 from the bottom 52 of the ring gear 50.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modification, both as to equipment details and operating procedures can be affected without departing from the scope of the invention itself. Further, it should be understood that, although the present invention has been described with reference to specific details of certain embodiments thereof, it is not intended that such details should be regarded as limitations upon the scope of the invention except as and to the extent that they are included in the accompanying claims.

What is claimed is:

1. An apparatus for a clarifier including a central pier terminating in a base plate having a circumferential edge and a ring gear having a bottom and an outer circumferential surface, the apparatus comprising:
   a. a plurality of support bearings, each support bearing having an upper surface, a spaced-apart, opposite, lower surface, and a pair of spaced-apart ends, the lower surface of each support bearing seated on and supported by a portion of the base plate and a portion of the upper surface of each support bearing for support of a portion of the bottom of the ring gear, the support bearings placed substantially end-to-end to form a circular bearing extending towards the circumferential edge of the base plate; and
   b. a retaining ring structure in rotative contact with a portion of the outer circumferential surface of the ring gear, the ring structure including a plurality of semi-circular retaining members, each retaining member having a proximal end and a distal end, the proximal end of one retaining member adapted to be removably coupled to the distal end of an adjoining retaining member such that the retaining members may be removably coupled to each other to form a circular hoop extending normal to the circumferential edge of the base plate, a portion of the circular hoop coupled to the circumferential edge of the base plate, wherein the retaining ring structure aligns the ring gear to rotation about a fixed axis.

2. The apparatus of claim 1, wherein the circular bearing is continuous.

3. The apparatus of claim 1, wherein the circular bearing is discontinuous.

4. The apparatus of claim 1, wherein each retaining member has an arcuate interior surface, wherein a portion of the arcuate interior surface of each retaining member is in rotative contact with the portion of the outer surface of the ring gear.

5. The apparatus of claim 4, wherein the portion of the arcuate interior surface of each retaining member that is in rotative contact with the ring gear is formed from a bearing material.

6. The apparatus of claim 1, wherein the circular hoop of the ring structure has an interior surface, and wherein the ring structure further includes a plurality of locating bearing members, each locating bearing member interposed between a portion of the interior surface of the circular hoop and the portion of the outer circumferential surface of the ring gear.

7. The apparatus of claim 1, wherein each support bearing is formed from a polymer.

8. The apparatus of claim 6, wherein each locating bearing is formed from a metal impregnated polymer.

9. The apparatus of claim 8, wherein the locating bearing is flexible.

10. The apparatus of claim 1, wherein the support bearings are semi-circular in shape.

11. An apparatus for a clarifier including a central pier terminating in a base plate having a circumferential edge and a ring gear having a bottom and an outer circumferential surface, a portion of the outer surface of the ring gear forming a circumferentially extending stop flange, the apparatus comprising:
   a. a plurality of support bearings, each support bearing having an upper surface, a spaced-apart, opposite, lower surface, and a pair of spaced-apart ends, the lower surface of each support bearing seated on and supported by a portion of the base plate and a portion of the upper surface of each support bearing for support of a portion of the bottom of the ring gear, the support bearings placed substantially end-to-end to form a circular bearing extending towards the circumferential edge of the base plate; and b. a retaining ring structure in rotative contact with a portion of the outer circumferential surface of the ring gear, the retaining ring structure including a plurality of semi-circular retaining members and a plurality of locating bearing members, each retaining member having a proximal end and a distal end, the proximal end of one retaining member adapted to be removably coupled to the distal end of an adjoining retaining member such that the retaining members may be removably coupled to each other to form a circular hoop having an interior surface and extending normal to the circumferential edge of the base plate, a portion of the interior surface of the circular loop coupled to the circumferential edge of the base plate, each locating bearing member interposed between a portion of the interior surface of the circular hoop and a portion of the outer surface of the ring gear that abuts the stop flange of the ring gear, the circular loop and the locating bearing members aligning the ring gear to rotation about a fixed axis.

12. The apparatus of claim 11, wherein the support bearings are semi-circular in shape.

13. The apparatus of claim 11, wherein each locating bearing member is interposed between a portion of the interior surface of the circular hoop and a portion of the circular bearing.

14. The apparatus of claim 11, wherein the circular bearing is continuous.

15. The apparatus of claim 11, wherein the circular bearing is discontinuous.

16. The apparatus of claim 11, wherein each support bearing is formed from a polymer.

17. The apparatus of claim 11, wherein each locating bearing is formed from a metal impregnated polymer.

18. The apparatus of claim 17, wherein the locating bearing is flexible.

19. The apparatus of claim 11, wherein each locating bearing is sized to complementarily fit within the portion of the outer surface of the ring gear that abuts the stop flange of the ring gear.

20. The apparatus of claim 19, wherein the locating bearing has a top edge and a bottom edge, wherein, in use, a portion of the bottom edge bears on a portion of the top surface of the base plate, the stop flange of the ring gear and the base plate restraining the locating bearing against edgewise movement along the outer surface of the ring gear.

21. An apparatus for a clarifier including a central pier terminating in a base plate having a circumferential edge and a top surface, and a ring gear having a bottom and an outer circumferential surface, the apparatus comprising:

a. a plurality of support bearings, each support bearing having an upper surface, a spaced-apart, opposite, lower surface, and a pair of spaced-apart ends, the lower surface of each support bearing seated on and supported by a portion of the base plate and a portion of the upper surface of each support bearing for support of a portion of the bottom of the ring gear, the support bearings placed substantially end-to-end to form a circular bearing extending towards the circumferential edge of the base plate; and b. a retaining ring structure in rotative contact with a portion of the outer circumferential surface of the ring gear, the retaining ring structure including a plurality of semi-circular retaining members and a plurality of locating bearing members, each retaining member having an arcuate interior surface, a proximal end, and a distal end, the proximal end of one retaining member adapted to be removably coupled to the distal end of an adjoining retaining member such that the retaining members may be removably coupled to each other to form a circular hoop having an interior surface and extending normal to the circumferential edge of the base plate, a portion of the interior surface of the circular loop coupled to the circumferential edge of the base plate, each retaining member further comprising an outwardly extending lip extending from a portion of the arcuate interior surface of the retaining member, wherein a female indentation is defined in a portion of the interior surface of the formed circular hoop, the female indentation extending from the top surface of the base plate proximate the circumferential edge of the base plate to the outwardly extending lip of each of the coupled retaining members, each locating bearing member interposed between a portion of the interior surface of the circular hoop that abuts the outwardly extending lip of one or more retaining members and a portion of the outer circumferential surface of the ring gear, the circular loop and the locating bearing members aligning the ring gear to rotation about a fixed axis.

22. The apparatus of claim 21, wherein each locating bearing member is interposed between a portion of the interior surface of the circular hoop and a portion of the circular bearing.

23. The apparatus of claim 21, wherein each locating bearing is sized to complementarily fit within the female indentation defined in the portion of the interior surface of the formed circular hoop.

24. The apparatus of claim 23, wherein the locating bearing has a top edge and a bottom edge, wherein, in use, a portion of the bottom edge bears on a portion of the top surface of the base plate, the stop flange of the ring gear and the base plate restraining the locating bearing against edgewise movement along the outer surface of the ring gear.

25. An apparatus for a clarifier including a central pier, a drive mechanism having a drive mount, and a ring gear having a bottom and an outer circumferential surface, the ring gear rotatable about the central pier and coupled to a rake structure, the apparatus comprising:

a. a base plate having a circumferential edge, a top surface and an opposed, spaced-apart bottom surface, a portion of the bottom surface of the base plate connected to the pier, the top surface of the base plate having at least one base plate flange extending upwardly therefrom, the base plate flange spaced from the circumferential edge of the base plate a first radial length, the drive housing fixedly connected to the top surface a second radial distance from the circumferential edge of the base plate, the second radial distance being greater than the first radial distance;

b. a removable bearing assembly comprising:

i. a plurality of support bearings, each support bearing having an upper surface, a spaced-apart, opposite, lower surface, a pair of spaced apart ends, an inner shoulder surface, and an opposite outer shoulder surface, the lower surface of each support bearing seated on and supported by a portion of the top surface of the base plate and the upper surface of each support bearing for support of a portion of the bottom of the ring gear, a portion of the inner shoulder surface of each support bearing seated against the base plate flange, the support bearings placed substantially end-to-end to each other to form a circular bearing extending towards the circumferential edge of the base plate; and ii. a retaining ring structure in rotative contact with a portion of the outer circumferential surface of the ring gear, the ring structure including a plurality of semi-circular retaining members and a plurality of locating bearing members, each retaining member having a proximal end and a distal end, the proximal end of one retaining member adapted to be removably coupled to the distal end of an adjoining retaining member such that the retaining members may be removably coupled to each other to form a circular hoop extending normal to the circumferential edge of the base plate, the circular hoop having an interior surface, a portion of the interior surface of the circular hoop coupled to the circumferential edge of the base plate, each locating bearing member interposed between a portion of the interior surface of the circular hoop and a portion of the outer circumferential surface of the ring gear, wherein the retaining ring structure aligns the ring gear to rotation about a fixed axis; and c. an adjustment mechanism selectively operable with the ring gear to adjust a vertical position of the ring gear relative to the top surface of the base plate, whereby the bearing assembly or portions thereof may be replaced without disconnecting the drive assembly from the pier and without disconnecting the rake structure from the ring gear.

26. The apparatus of claim 25, wherein the support bearings are semi-circular in shape.

27. The apparatus of claim 25, wherein each support bearing is interposed between a portion of the base plate flange and a portion of at least one locating bearing member.

28. The apparatus of claim 27, wherein a portion of the outer shoulder surface of each support bearing is in contact with a portion of at least one locating bearing member.

29. The apparatus of claim 25, wherein the circular bearing is continuous.

30. The apparatus of claim 25, wherein the circular bearing is discontinuous.

31. The apparatus of claim 25, wherein each support bearing is formed from a polymer.

32. The apparatus of claim 25, wherein each locating bearing is formed from a metal impregnated polymer.

33. The apparatus of claim 32, wherein each locating bearing is flexible.

34. The apparatus of claim 25, wherein the adjustment mechanism comprises:

a. a plurality of circumferentially spaced-apart threaded bolt holes extending through the base plate, the bolt holes spaced a third radial length from the circumferential edge of the base plate, the third radial length being greater than or equal to the first radial length and less than the second radial length; and b. a plurality of support bolts which threadibly engage the threaded bolt holes in the base plate, the support bolts moveable from a first position, in which the support bolts are not in contact with a portion of the bottom of the ring gear, to a second position, in which a portion of the support bolts protrude above the top surface of the base plate to contact a portion of the bottom of the ring gear such that the ring gear is vertically raised and is supported by the support bolts and such that the support bearings may be disconnected from the ring gear and the base plate.

35. A method of performing maintenance on a bearing assembly of a substantially horizontal ring gear of a clarifier, the clarifier having a central pier having a top and a drive mechanism having a drive mount, the drive mechanism operatively connected to the ring gear, the method comprising:

providing a base plate which is connected to the top of the central pier, the base plate having a circumferential edge and a top surface, the top surface of the base plate having at least one base plate flange extending outwardly therefrom, the base plate flange spaced from the circumferential edge a first radial length, the drive mount of the drive mechanism fixedly connected to the top surface of the base plate a second radial distance from the circumferential edge, the second radial distance being greater than the first radial distance;

providing a removable bearing assembly including:

a) a plurality of support bearings, each support bearing having an upper surface, a spaced, opposite, lower surface, a pair of spaced-apart ends, an inner shoulder surface, and an opposite outer shoulder surface, the lower surface of each support bearing seated on and supported by a portion of the top surface of the base plate and a portion of the upper surface of each support bearing for support of a portion of the bottom of the ring gear, a portion of the inner shoulder surface of each support bearing seated against the base plate flange, the support bearings placed substantially end-to-end to form a circular bearing extending towards the circumferential edge of the base plate;

b) a retaining ring structure in rotative contact with a portion of the outer surface of the ring gear, the ring structure including a plurality of semi-circular retaining members and a plurality of locating bearing members, each retaining member having a proximal end and a distal end, the proximal end of one retaining member adapted to be removably coupled to the distal end of an adjoining retaining member such that the retaining members may be removably coupled to each other to form a circular hoop extending normal to the circumferential edge of the base plate, the circular hoop having an interior surface, a portion of the interior surface of the circular hoop coupled to the circumferential edge of the base plate, each locating bearing member interposed between a portion of the interior surface of the circular hoop and a portion of the outer circumferential surface of the ring gear, wherein the retaining ring structure restrains the ring gear to rotation about a fixed axis;

providing an adjustment mechanism selectively operable with the ring gear to adjust a vertical position of the ring gear relative to the top surface of the base plate;

actuating the adjustment mechanism to raise the ring gear relative to the top surface of the base plate;

uncoupling the retaining members for accessing the support bearings and the locating bearings; and removing the locating bearings and the support bearings.

36. The method of claim 35, further comprising:

placing the support bearings onto the top surface of the base plate and against one or more base plate flanges;

placing the locating bearings against a portion of the outer circumferential surface of the ring gear;

coupling the retaining members about the circumferential edge of the base plate for enclosing the support bearings and the locating bearings; and actuating the selectively operable adjustment mechanism to lower the ring gear relative to the top surface of the base plate and place the portion of the bottom of the ring gear in rotative contact with the portion of the upper surface of the support bearings.

37. The method of claim 36, wherein the adjustment mechanism has a plurality of circumferentially spaced-apart threaded bolt holes extending through the base plate, the bolt holes spaced a third radial length from the circumferential edge of the base plate, the third radial length greater than or equal to the first radial length and less than the second radial length, and a plurality of support bolts which threadibly engage the threaded bolt holes in the base plate, wherein actuating the adjustment mechanism to raise the ring gear comprises:

moving the support bolts from a first position, in which the support bolts are not in contact with a portion of the bottom of the ring gear, to a second position, in which a portion of the support bolts protrude above the top surface of the base plate to contact a portion of the bottom of the ring gear such that the ring gear is vertically raised and is supported by the support bolts and such that the support bearings may be disconnected from the ring gear.

38. The method of claim 37, wherein actuating the selectively operable adjustment mechanism to lower the ring gear comprises:

moving the support bolts from the second position, in which a portion of the support bolts protrude above the top surface of the base plate to contact a portion of the bottom of the ring gear such that the ring gear is vertically raised and is supported by the support bolts, to the first position, in which the support bolts are not in contact with a portion of the bottom of the ring gear such that the portion of the bottom of the ring gear is operably disposed on the portion of the upper surface of the support bearings.

* * * * *